US012172320B2

(12) United States Patent
Wang et al.

(10) Patent No.: US 12,172,320 B2
(45) Date of Patent: Dec. 24, 2024

(54) SYSTEM, METHOD AND STORAGE MEDIUM FOR PRODUCTION SYSTEM AUTOMATIC CONTROL

(71) Applicant: Siemens Aktiengesellschaft, Munich (DE)

(72) Inventors: Zi Jian Wang, Beijing (CN); Ye Hu, Beijing (CN); Ji Li, Beijing (CN); Shun Jie Fan, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/687,585

(22) PCT Filed: Aug. 31, 2021

(86) PCT No.: PCT/CN2021/115805
§ 371 (c)(1),
(2) Date: Feb. 28, 2024

(87) PCT Pub. No.: WO2023/028881
PCT Pub. Date: Mar. 9, 2023

(65) Prior Publication Data
US 2024/0261968 A1   Aug. 8, 2024

(51) Int. Cl.
*B25J 9/00* (2006.01)
*B25J 9/16* (2006.01)

(52) U.S. Cl.
CPC ........... *B25J 9/1666* (2013.01); *B25J 9/1661* (2013.01); *B25J 9/1687* (2013.01)

(58) Field of Classification Search
CPC ....... B25J 9/1666; B25J 9/1661; B25J 9/1687
See application file for complete search history.

(56) References Cited

U.S. PATENT DOCUMENTS

| 6,553,223 B1 | 4/2003 | Bayley et al. ................. 455/419 |
| 2016/0132037 A1 | 5/2016 | Weng et al. .................... 700/87 |

(Continued)

FOREIGN PATENT DOCUMENTS

| CN | 108 400 917 | 8/2018 | ............. H04L 12/40 |
| CN | 111 427 310 | 7/2020 | ........... G05B 19/414 |

(Continued)

OTHER PUBLICATIONS

Herrero H, Outón JL, Puerto M, Sallé D, López de Ipiña K. Enhanced Flexibility and Reusability through State Machine-Based Architectures for Multisensor Intelligent Robotics. Sensors (Basel). May 31, 2017;17(6):1249. (Year: 2017).*

(Continued)

*Primary Examiner* — Ramon A. Mercado
*Assistant Examiner* — Shaheda Hoque
(74) *Attorney, Agent, or Firm* — Slayden Grubert Beard PLLC

(57) ABSTRACT

An example system includes: a production system skill library, with a plurality of skill blocks describing and encapsulating the realization part of the skills involved in the production process; a unified execution engine with a plurality of skill function blocks describing and encapsulating the interface part of the skills involved in the production process; to receive a production procedure programmed by a user based on the skill function blocks, and successively start each skill function block in the production procedure to call at least one corresponding skill block; and device agents for controlling devices in the production system. Each device agent is used to provide a unified interface to control the corresponding device to perform operations according to the operation instructions from the unified execution engine or the skill block.

15 Claims, 7 Drawing Sheets

(56) References Cited

U.S. PATENT DOCUMENTS

2020/0030979 A1    1/2020  Bank ...................... B25J 9/1671
2020/0230817 A1    7/2020  Han ....................... B25J 9/1669

FOREIGN PATENT DOCUMENTS

JP          2012075151 A    4/2012  ............. G06F 13/10
JP           201695844 A    5/2016  ........... G05B 19/042

OTHER PUBLICATIONS

Search Report for International Application No. PCT/CN2021/115805, 9 pages, May 25, 2022.
Japanese Office Action, Application No. 2024513403, 7 pages, Sep. 3, 2024.

* cited by examiner

SYSTEM, METHOD AND STORAGE MEDIUM FOR PRODUCTION SYSTEM AUTOMATIC CONTROL

CROSS-REFERENCE TO RELATED APPLICATIONS

This application is a U.S. National Stage Application of International Application No. PCT/CN2021/115805 filed Aug. 31, 2021, which designates the United States of America, the contents of which are hereby incorporated by reference in their entirety.

TECHNICAL FIELD

The present disclosure relates to industrial technologies. Various embodiments of the teachings herein include systems, methods, and computer readable storage media for production system automatic control.

BACKGROUND

At present, manufacturing is shifting from mass production to small batch production. Therefore, it is necessary to reprogram production systems(including robots, actuators, sensors, etc.) in a short time to meet the production demand of the rapidly changing market.

Patent application CN108400917A proposes an edge computing gateway and system for intelligent manufacturing. A production gateway exchanges knowledge with a resource gateway through a request/response procedure to obtain information about how to manufacture a product. Patent application US2020/0230817A proposes a skill-based robot programming method. By providing proper parameters, the user can use the work unit item with main skills to program the robot and its peripherals.

In addition, those skilled in the art are also committed to finding other automatic control schemes for production systems.

SUMMARY

Some embodiments of the teachings of the present disclosure include systems, methods, and computer readable storage media for production system automatic control to realize simple and convenient automatic control programming of production system. As an example, some embodiments include a system for production system automatic control including: a production system skill library, a unified execution engine, and device agents for controlling corresponding devices in production system; wherein, the production system skill library is provided with a plurality of skill blocks describing and encapsulating implementation part of skills involved in production process in a software method, and the production system skill library is configured to call at least one corresponding skill block according to a received service request, and return a corresponding service response according to an execution result of the at least one skill block; the at least one skill block sends an operation instruction to a corresponding device agent according to the needs of skill execution; the unified execution engine is provided with a plurality of skill function blocks describing and encapsulating interface part of the skills involved in the production process in a software method; the unified execution engine is configured to obtain a production procedure programmed by a user based on the skill function blocks, sequentially start each skill function block in the production procedure; when a skill function block is started, the skill function block sends a service request to the production system skill library and receives a service response from the production system skill library, sends an operation instruction to a corresponding device agent according to the needs of the service response; each device agent is configured to provide a unified interface for the unified execution engine and the production system skill library, receive the operation instruction from the unified execution engine or a skill block in the production system skill library, and control a corresponding device to perform operations according to the operation instruction, and feed back a current operation state or an operation result to the unified execution engine or the skill block.

In some embodiments, the production system skill library includes: a skill management module, a plurality of skill blocks and a first communication interface; wherein, each skill block describes and encapsulates the implementation part of a skill involved in the production process in a software method, which is configured to execute corresponding skill when called, and interact with the corresponding device agent according to the needs of skill execution; the skill management module is configured to parse the service request received through the first communication interface, call at least one corresponding skill block according to a parsing result, and receive and output a service response returned by the at least one skill block.

In some embodiments, the plurality of skill blocks includes: at least one action sequence skill block, each action sequence skill block is a single skill block or a combination of multiple interrelated skill blocks, and the service response of the action sequence skill block feeds back an action sequence; at least one sensor output skill block, each sensor output skill block obtains data of a field sensor through interaction with a sensor agent, or obtains data output by a sensor processing algorithm with sensor data as input; the service response of the sensor output skill block feeds back sensor output data; at least one algorithm computing skill block, the service response of the algorithm computing skill block feeds back corresponding calculation results.

In some embodiments, the action sequence skill block is a combination of an environment modeling skill block, a collision-free path planning skill block and a collision-free palletizing skill block; wherein, the environment modeling skill block is configured to identify an obstacles and generate an environment model; the collision-free path planning skill block is configured to calculate way points forming a path where a device will not collide with the environment when the environment model is given; the collision-free palletizing skill block is configured to generate the whole palletizing action sequence; the sensor output skill blocks comprises: the 3D object position estimation skill block, to calculate the length, width, height and 6-DOF position of the package; and the palletizing position calculation skill block, to calculate the position where new packages are placed in the stacking.

In some embodiments, the unified execution engine includes: a skill execution engine, a plurality of skill function blocks, an action queue, an action execution engine, a second communication interface and a third communication interface; wherein, each skill function block corresponds to at least one skill block, and each skill function block is configured to describe and encapsulate the interface part of a skill in a software method; when being executed, to send a service request to the production system skill library through the second communication interface, and receive a service response returned by the production system skill library; when the service response is an action sequence, to add the action sequence to the action queue, and read a current operation state of the action sequence from the action queue; when the current operation state indicates that all actions in the action sequence are completed, to return a completed indication to the skill execution engine; the skill execution engine is configured to obtain a production procedure programmed by a user based on the skill function blocks, and start each skill function block in the production procedure in turn; when current skill function block returns a completed indication, to start the next skill function block; when the current skill function block returns a service response and when the service response needs to be used as the input of the next skill function block, to provide the service response to the next skill function block; the action queue is configured to store the action sequence in the service response and update a current operation state of the action sequence in real time; the action execution engine is configured to successively read actions in the action sequence when there is an action sequence in the action queue, send an operation instruction corresponding to at least one read action to a corresponding device agent through the third communication interface, and receive a current operation state fed back by the device agent, and provide the current operation state to the action queue; when the current operation state indicates that the current action is successfully executed, delete the current action from the action sequence until the action queue is empty.

In some embodiments, each skill function block maintains a state machine, when the corresponding skill function block is not started, the state machine is "idle" state; when the corresponding skill function block is started, the state machine is converted to "active" state; when the corresponding skill function block is successfully executed, the state machine is converted to "done" state; when an error occurs in the execution of the corresponding skill function block, the state machine is converted to "error" state.

In some embodiments, the device agents includes: a robot agent, and the robot agent includes a fourth communication interface, a command queue, a command execution engine, a motion command channel, a force motion adjustment module, an interpolation channel, and a robot state channel; wherein, the command queue is configured to store operation instructions received through the fourth communication interface; the command execution engine is configured to successively read each operation instruction from the command queue; when the operation instruction is a pure motion instruction, to send the operation instruction to a robot controller through the motion command channel; when the operation instruction is a motion instruction maintaining a certain applied force, to provide the operation instruction to the force motion adjustment module, to receive a current operation state fed back by the robot controller through the robot state channel; the force motion adjustment module is configured to dynamically determine motion of robot axis joint according to the operation instruction and force data collected in real time by a force sensor, and provide the motion of the axis joint to the robot controller through the interpolation channel.

In some embodiments, the force motion adjustment module includes an instruction parsing module, a motion path planning module, a force control module and a conversion module; wherein, the instruction parsing module is configured to analyze the operation instruction and obtain control information of a robot; the motion path planning module is configured to plan a Cartesian space path and a speed of a terminal center point of a robot tool, and provide the Cartesian space path to the force control module, and obtain a fine tuned Cartesian space path fed back by the force control module, provide the fine-tuned Cartesian space path to the conversion module, and receive an axis joint position of the robot converted by the conversion module, and provide the axis joint position and the speed to the robot controller; the force control module is configured to obtain force data of the terminal center point of the robot tool measured by a force sensor during the process of robot movement, fine tune the Cartesian space path from the motion path planning module according to the force data to obtain a fine tuned Cartesian space path to maintain a required force, and feedback the fine-tuned Cartesian space path to the motion path planning module.

In some embodiments, the device agents includes: a sensor agent and/or a tool agent, the sensor agent or the tool agent includes: a fourth communication interface, a command processing module, a command channel, and a feedback channel; wherein, the command processing module is configured to provide an operation instruction received through the fourth communication interface to a corresponding device through the command channel, receive a current operation state or an operation result fed back by the device through the feedback channel, and transmit the current operation state or the operation result back to the bus through the fourth communication interface.

As another example, some embodiments include a method for production system automatic control including: presetting a plurality of skill blocks describing and encapsulating implementation part of skills involved in production process in a software method and a plurality of skill function blocks describing and encapsulating interface part of the skills involved in the production process in a software method; receiving a production procedure programmed by a user based on the skill function blocks, and taking the first skill function block in the production procedure as current skill function block; starting the current skill function block to call at least one corresponding skill block, each called skill block executes corresponding skill, and controlling a corresponding device to perform operation through a corresponding device agent according to demand of skill execution; receiving a service response returned by the skill block, and controlling a corresponding device to perform operation through a corresponding device agent according to needs of the service response; when the current skill function block is successfully executed and there is still a skill function block that has not been started, taking the next skill function block as the current skill function block, and return to the operation of starting the current skill function block to call at least one corresponding skill block.

In some embodiments, service response includes: an action sequence; wherein controlling a corresponding device to perform operation through a corresponding device agent according to demand of skill execution includes: adding the action sequence to an action queue; reading actions in the action sequence in turn; sending at least one operation instruction corresponding to read at least one action to a corresponding device agent; controlling, by the device agent, a corresponding device to execute the actions in the action sequence in turn according to the operation instruction, and feeding back a corresponding operation state; deleting current action from the action queue when determining that the execution of the current action is completed according to the operation state; when the action queue is empty, it is determined that the execution of the action sequence is completed.

In some embodiments, the device agent is a robot agent; wherein controlling, by the device agent, a corresponding device to execute the actions in the action sequence in turn according to the operation instruction, and feeding back a corresponding operation state, includes: adding the operation instruction to a command queue; sequentially reading each operation instruction from the command queue; when a read operation instruction is a pure motion instruction, sending the operation instruction to a robot controller to enable the robot controller to perform corresponding operation; when a read operation instruction is a motion instruction maintaining a certain applied force, dynamically determining a motion of the robot axis joint according to the operation instruction and force data collected in real time by a force sensor, and sending the motion of the axis joint to the robot controller to enable the robot controller to perform corresponding operation; receiving a current operation state fed back by the robot controller.

In some embodiments, dynamically determining a motion of the robot axis joint according to the operation instruction and force data collected in real time by a force sensor, and sending the motion of the axis joint to the robot controller to enable the robot controller to perform corresponding operation, includes: analyzing the operation instruction to obtain control information of a robot; planning a Cartesian space path and a speed of a terminal center point of a robot tool according to the control information; obtaining force data of the terminal center point of the robot tool measured by a force sensor during the movement of the robot; fine tuning the Cartesian space path according to the force data, and obtaining fine-tuned Cartesian space path; converting the fine-tuned Cartesian space path into a corresponding axis joint position; providing the axis joint position and the speed to the robot controller.

In some embodiments, each skill function block maintains a state machine, when the corresponding skill function block is not started, the state machine is "idle" state; when the corresponding skill function block is started, the state machine is converted to "active" state; when the corresponding skill function block is successfully executed, the state machine is converted to "done" state; when an error occurs in the execution of the corresponding skill function block, the state machine is converted to "error" state.

As another example, some embodiments include a system for production system automatic control including: at least one memory, to store a computer program; and at least one processor, to call the computer program stored in the at least one memory to perform one or more of the methods for production system automatic control described herein.

As another example, some embodiments include a non-transitory computer-readable storage medium storing a computer program to be executed by a processor to implement one or more of the methods for production system automatic control described herein.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures. In the figures.

Figure 1:
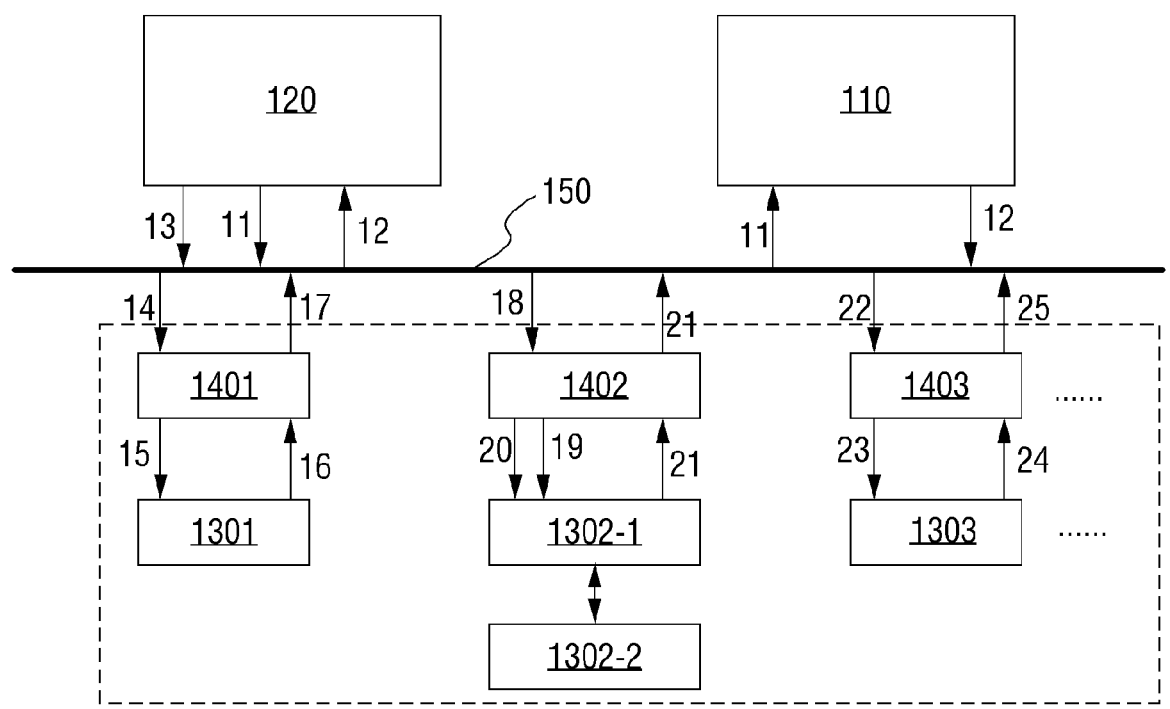
FIG. 1 is a schematic diagram illustrating an example system for production system automatic control incorporating teachings of the present disclosure.

The reference numerals are as follows:

| Reference numeral | Object |
| --- | --- |
| 110 | production system skill library |
| 111 | skill management module |
| 1121, 1121, 112i + 1, 112N | skill blocks |
| 112A | App generation module |
| 112B | requirement analysis module |
| 112C | function determination module |
| 112D | first intelligent matching module |
| 112E | second intelligent matching module |
| 113 | first communication interface |
| 114 | skill registrar |
| 120 | unified execution engine |
| 121 | skill execution engine |
| 1221, 1222, 122M | skill function blocks |
| 122A | Modbus TCP connector |
| 122B | PROFINET IO connector |
| 122C | data layer |
| 123 | action queue |
| 124 | action execution engine |
| 125 | second communication interface |
| 126 | third communication interface |
| 1301 | force sensor |
| 1302-1 | robot controller |
| 1302-2 | robot arm |
| 1303, 1303-1, 1303-2, 1303-3 | 3D camera |
| 1401 | force sensor agent |
| 1402 | robot agent |
| 1403, 1403-1, 1403-2, 1403-3 | 3D camera agent |
| 1404 | tool agent |
| 150 | data bus |
| 501A~506A, 501B~511B, S81~S86 | processes |
| 610 | fourth communication interface |
| 620 | command queue |
| 630 | command execution engine |
| 640 | motion command channel |
| 650 | force motion adjustment module |
| 651 | instruction parsing module |
| 652 | motion path planning module |
| 653 | force control module |

-continued

| Reference numeral | Object |
|---|---|
| 654 | conversion module |
| 660 | interpolation channel |
| 670 | robot state channel |
| 701~710 | action sequence |
| 91 | memory |
| 92 | processor |
| 93 | bus |

DETAILED DESCRIPTION

Skill blocks describing and encapsulating the implementation part of the skills involved in the production process by software method and a plurality of skill function blocks describing and encapsulating the interface part of the skills involved in the production process by software method are set respectively, In this way, the user only needs to program the production procedure based on the skill function block, and then the background calls the corresponding skill block by successively starting each skill function block in the production procedure to complete the corresponding production system skills, which simplifies the user's automatic control programming process of the production system and reduces the user's programming difficulty. Moreover, because the production system can be easily reprogrammed, it can cope with the rapid change of small batch production.

In some embodiments, to easily reprogram the production system in a short time, it is necessary to provide a reconfigurable manufacturing system. In other words, the production system should be software defined. The so-called software definition is to use software to define the functions of the system and use software to empower the hardware to maximize the system operation efficiency and energy efficiency. The essence of software definition is to realize the functions of virtualization, flexibility, diversity and customization through software programming on the basis of digitization and standardization of hardware resources, provide customized special intelligent and customized services, and realize the decoupling of application software and hardware. Its core is Application Programming Interface (API). API releases the coupling relationship between software and hardware, promotes the development of application software in the direction of personalization, hardware resources in the direction of standardization, and system functions in the direction of intelligence.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

FIG. 1 is a schematic diagram illustrating an example system for production system automatic control incorporating teaching of the present disclosure. As shown in FIG. 1, the automatic control system of production system may include: a production system skill library 110, a unified execution engine 120, device agents, such as a force sensor agent 1401, a robot agent 1402, a 3D camera agent 1403, . . . , for controlling various devices, such as a force sensor 1301, a robot controller 1302-1, a robot arm 1302-2, a 3D camera 1303, . . . , in the production system. Among them, the production system skill library 110, the unified execution engine 120 and the device agents 1401, 1402, 1403, . . . , are connected through a data bus 150.

The production system skill library 110 may also be called an Online Autonomous skill library, in which a plurality of skill blocks describing and encapsulating the implementation part of skills involved in the production process in a software method are set, and the production system skill library 110 is configured to call at least one corresponding skill block according to a received service request 11, and return a corresponding service response 12 according to an execution result of the at least one skill block; The at least one skill block interacts with a corresponding device agent according to the needs of skill execution. For example, send an operation instruction to the corresponding device agent and receive a current operation state or operation result fed back by the device agent.

Figure 2:
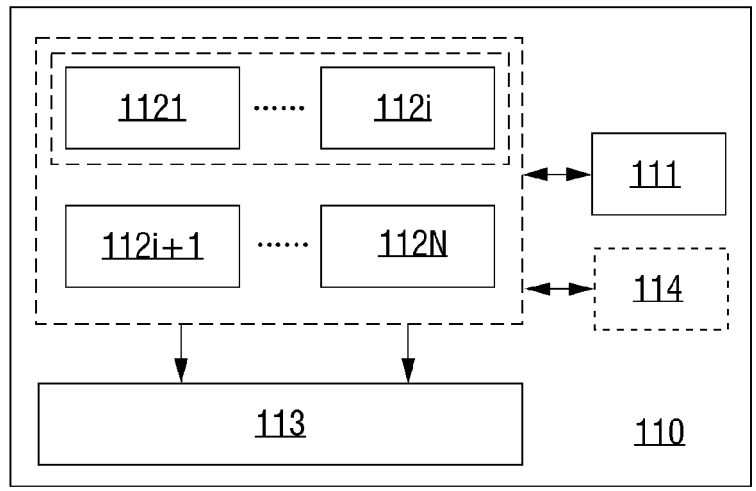
FIG. 2 is a schematic diagram illustrating an example production system skill library in the system shown in FIG. 1.

As shown in FIG. 2, the production system skill library 110 may include a skill management module 111, a plurality of skill blocks 1121, . . . 112$i$, 112$i$+1, . . . 112N and a first communication interface 113. i and N are positive integers. In addition, the production system skill library 110 may further include a skill registrar 114.

Each skill block 1121, . . . , 112$i$, 112$i$+1, . . . , 112N describes and encapsulates the implementation part of a skill involved in the production process in a software method, which is configured to execute the corresponding skill when called, and interact with the corresponding device agent according to the needs of skill execution. Each skill block may have corresponding attribute information, which may include:

Service request interface: indicates a mapping relationship between a service request and corresponding skill;
Input parameter: indicates an input parameter used by the skill block;
Output result: indicates a result calculated by the skill block;
Service response interface: used to write a service response.

The attribute information of each skill block can be preset, or registered through an open skill register 114 and stored in a skill registration table. Based on the skill register 114, the user can add a new skill block.

In terms of service response types, skill blocks can be classified as follows:

1) Action sequence skill blocks. Each action sequence skill block may include a single skill block or a combination of skill blocks including multiple interrelated skill blocks, and its service response will feed back an action sequence. For example, an action sequence composed of robot motion (such as linear motion), actuator operation (such as opening the gripper), etc.
2) Sensor output skill blocks. Different sensor output skill blocks may have different implementation methods. For example, a sensor output skill block can obtain field sensor data by interacting with a sensor agent, or can also obtain data output by a sensor processing algorithm that takes sensor data as input. Its service response will feed back corresponding sensor output data. For example, the sensor output data may include an object position (such as a Cartesian spatial position (x, y, z); or Cartesian spatial position (x, y, z)+Cartesian spatial attitude (rx, ry, rz)), environmental model (such as collision obstacles), etc. Sensors here refer to sensors in a broad sense, including force sensors, 3D cameras, etc.

3) Algorithm computing skill block, whose service response will feed back corresponding calculation outputs. For example, the calculation outputs can be calculated by production-based algorithms, including movement patterns, object place position, etc.

In addition, in terms of skill types, skill blocks may include common skill blocks 1121, . . . , 112i and task skill blocks 112i+1, . . . , 112N (namely skill blocks for certain tasks). The common skill blocks may include an object identification skill block, a collision-free path planning skill block, etc. The task skill blocks may include: a palletizing skill block, a grinding skill block, an assembly skill block, a welding skill block, etc. In addition, a common skill block may be called during the execution of a task skill block.

The skill management module 111 is configured to parse the service request 11 received through the first communication interface 113, call at least one corresponding skill block according to a parsing result, provide an input parameter to a corresponding skill block when the service request carries the input parameter, receive a service response 12 returned by the at least one skill block, and output the service response 12.

The unified execution engine 120 is provided with a plurality of skill function blocks that describe and encapsulate the interface part of the skills involved in the production process in a software method for the user to program a production procedure of the production system. The unified execution engine 120 is configured to obtain a production procedure programmed by a user, sequentially start each skill function block in the production procedure. When a skill function block is started, it sends a corresponding service request 11 to the production system skill library 110 and receives a service response 12 from the production system skill library 110, interact with a corresponding device agent according to the needs of the service response. For example, send operation instruction(s) 13 to corresponding device agent and receive a current operation state or operation result fed back by the device agent.

Figure 3:
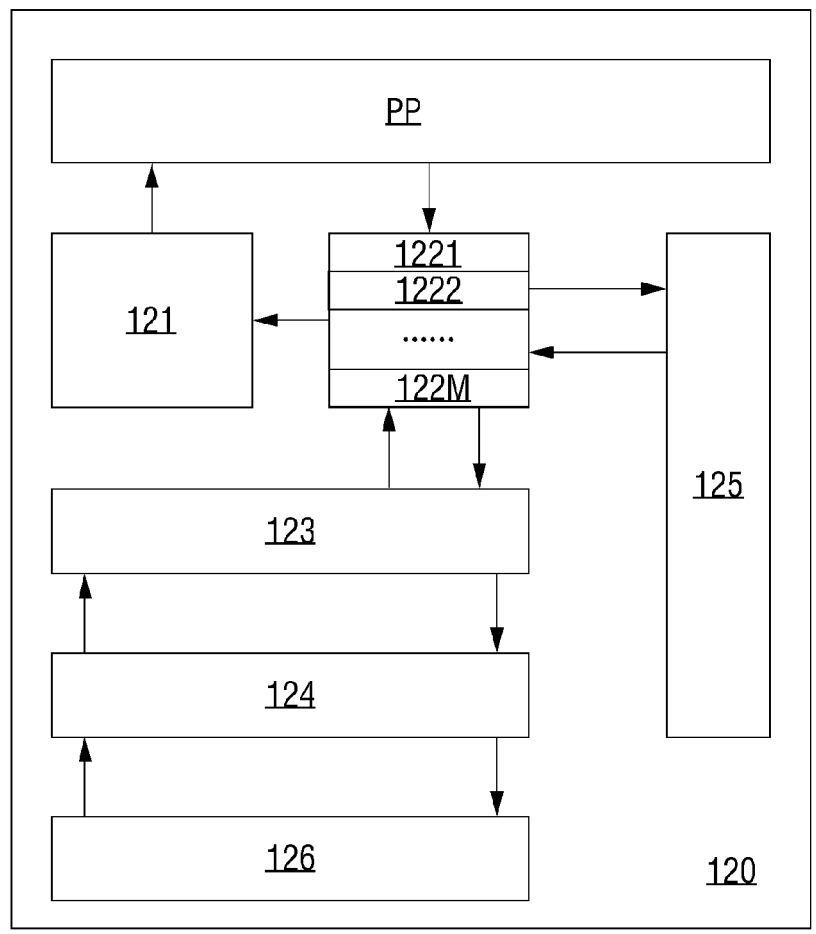
FIG. 3 is a schematic diagram illustrating an example unified execution engine in the system shown in FIG. 1.

As shown in FIG. 3, when specifically implemented, the unified execution engine 120 may include a skill execution engine 121, a plurality of skill function blocks 1221, 1222 . . . , 122M, an action queue 123, an action execution engine 124, a second communication interface 125 and a third communication interface 126. Wherein M is a positive integer.

Each skill function block corresponds to at least one skill block, and each skill function block is configured to describe and encapsulate the interface part of the corresponding skill in a software method for the user to program a production procedure of the production system. When being executed, the skill function block will send a corresponding service request to the production system skill library 110 through the second communication interface 125. If there is an input parameter, the skill function block will carry the input parameter in the service request, and receive a service response returned by the production system skill library 110. When the service response is an action sequence, the skill function block will add the action sequence to the action queue 123 and read a current operation state of the action sequence from the action queue 123. When the current operation state indicates that all actions in the action sequence are completed, the skill function block returns a completed indication to the skill execution engine 121. When the current operation state indicates that there is an error in current action execution, the skill function block returns an error indication to the skill execution engine 121; otherwise, when the service response is not action sequence, the service response may be provided to the skill execution engine 121.

Figure 4:
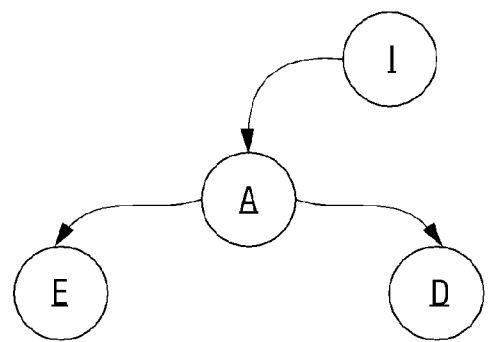
FIG. 4 is a schematic diagram illustrating states of an example state machine incorporating teachings of the present disclosure.

During specific implementation, each skill function block can maintain a state machine, as shown in FIG. 4, the state machine may include four states, namely "idle" state I, "active" state A, "done" state D and "error" state E. The state machine is "idle" state when the corresponding skill function block is not started; when the corresponding skill function block is started, the state machine is converted to the "active" state; when the corresponding skill function block is successfully executed, the state machine is converted to the "done" state; when an error occurs in the execution of the corresponding skill function block, the state machine is converted to the "error" state.

Figure 5A:
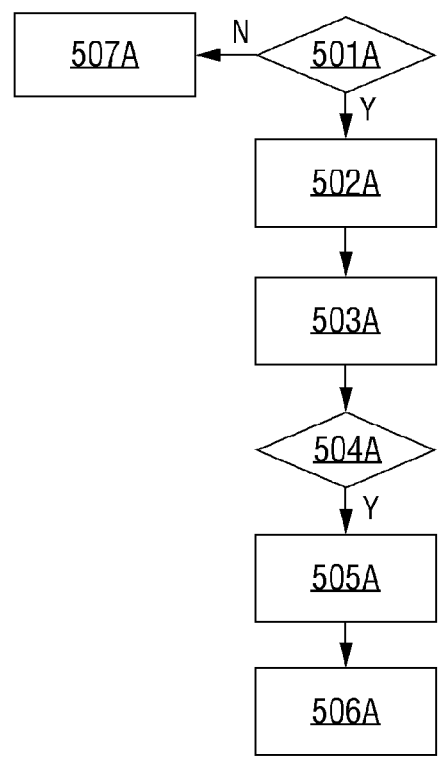
FIGS. 5A and 5B are flow diagram respectively illustrating an example state machine transition incorporating teachings of the present disclosure.
Figure 5B:
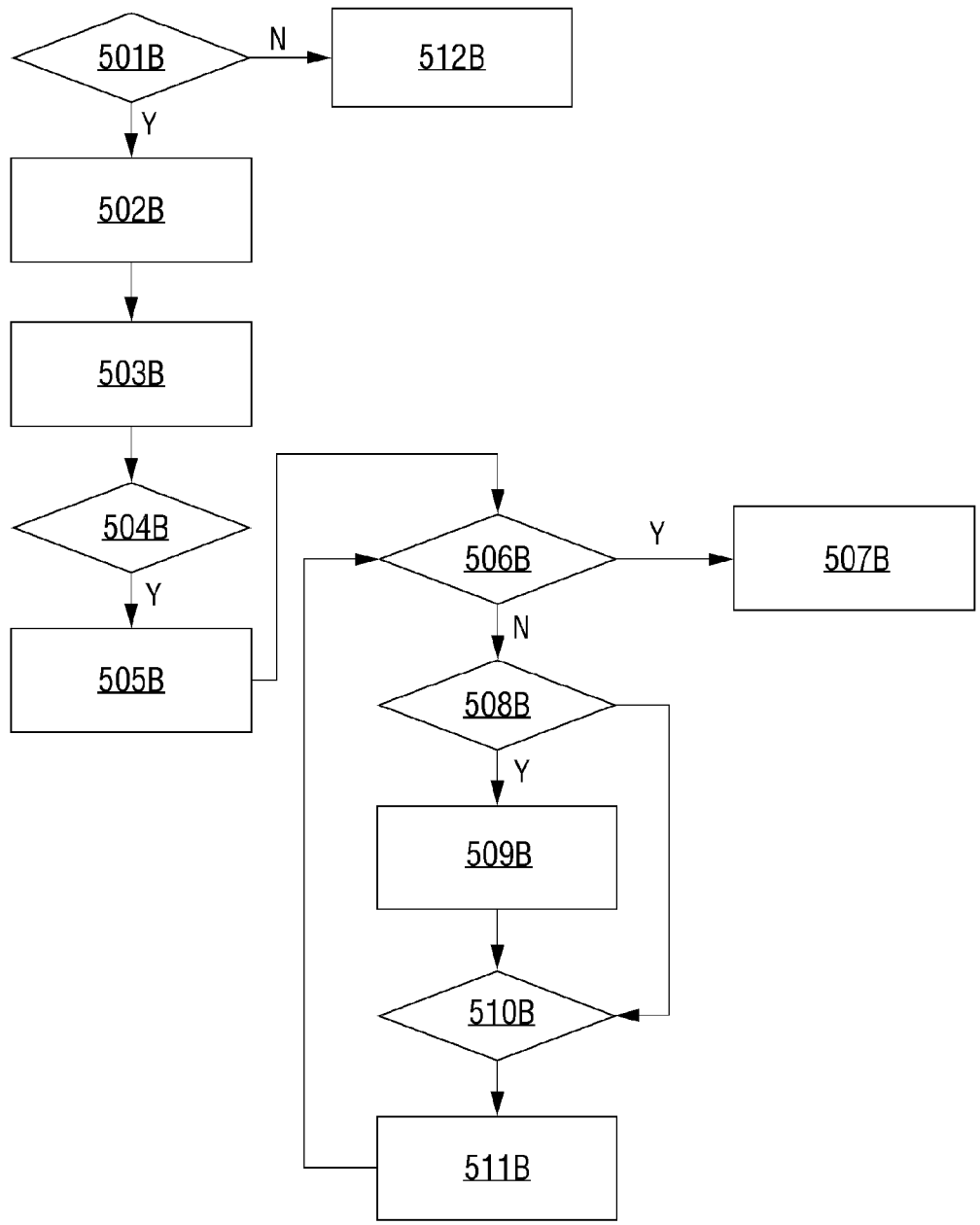

FIGS. 5A and 5B are flow diagrams respectively illustrating an example state machine transition incorporating teachings of the present disclosure. FIG. 5A is a flow diagram illustrating the transition of the state machine when the skill block corresponding to the skill function block is a non-action-sequence skill block according to an example of the present disclosure. As shown in FIG. 5A, in this example, the conversion process of the state machine may include the following processes:

At block 501A, it is determined whether the current skill function block is started. When the current skill function block is started, block 502A is performed; otherwise, block 507A is performed to set the state machine to the "idle" state.

At block 502A, the state machine is set to the "active" state.

At block 503A, a corresponding service request is sent to the production system skill library 110.

At block 504A, it is determined that whether a service response is received, when the service response is received, block 505A is performed; otherwise, continue to wait.

At block 505A, a result of the service response is output.

At block 506A, the state machine is set to the "done" state.

FIG. 5B is a flow diagram illustrating the transition of the state machine when the skill block corresponding to the skill function block is an action sequence skill block according to an example of the present disclosure. As shown in FIG. 5B, in this example, the conversion process of the state machine may include the following processes:

At block 501B, it is determined that whether the current skill function block is started. When the current skill function block is started, block 502B is performed; otherwise, block 512B is performed to set the state machine to the "idle" state.

At block 502B, the state machine is set to the "active" state.

At block 503B, a corresponding service request is sent to the production system skill library 110.

At block 504B, it is determined that whether a service response is received. When the service response is received, block 505B is performed; otherwise, continue to wait.

At block 505B, an action sequence in the service response is stored in an action queue.

At block 506 B, it is determined that whether the action queue is empty, when the action queue is empty, block 507B is performed; otherwise, block 508B is performed.

At block 507B, the state machine is set to the "done" state. At this time, the skill function block may return a completed instruction to the skill execution engine 121.

At block 508B, it is determined that whether there are unread actions in the action queue. When there are unread actions in the action queue, block 509B is performed; otherwise, block 510B is performed.

At block 509B, the first k actions in the action queue is read and sent to a corresponding device agent. Where k is an integer greater than or equal to 1.

At block 510B, it is determined that whether the device agent feeds back an operation state indicating that the current action is done. When the device agent feeds back the operation state indicating that the current action is done, block 511B is performed.

At block 511B, the current action is deleted from the queue and return to block 506B.

The skill execution engine 121 is configured to obtain a production procedure programmed by the user based on the skill function blocks 1221, 1222 and 122N, and start each skill function block in the production procedure in turn. Specifically, when the current skill function block returns the completed indication, the skill execution engine 121 start the next skill function block; when the current skill function block returns an error indication, the program can be stopped and an alarm can be given. When the current skill function block returns a service response, such as sensor data or a calculation result, and if the service response needs to be used as the input of the next skill function block, the service response will be provided to the next skill function block.

The action queue 123 is configured to store the action sequence in the service response and update a current operation state of the action sequence in real time.

The action execution engine 124 is configured to successively read the actions in the action sequence when there is an action sequence in the action queue 123, such as the first k actions (k is greater than or equal to 1) each time, send operation instructions corresponding to the read actions to a corresponding device agent through the third communication interface 126, and receive a current operation state fed back by the device agent, and provide the current operation state to the action queue 123; when the current operation state indicates that the current action is successfully executed, delete the current action from the action sequence until the action queue 123 is empty. In addition, when the current operation state indicates that the current action has an error, the program operation may be stopped. In addition, the current operation state may indicate normal execution, etc.

Each device agent is configured to provide a unified interface for the unified execution engine 120 and the production system skill library 110, receive operation instructions from the unified execution engine 120 or a skill block in the production system skill library 110, and control a corresponding device to perform operations according to the operation instructions, and feedback a current operation state or an operation result to the unified execution engine 120 or the skill block.

For example, as shown in FIG. 1, a force sensor agent 1401 receives a force sensor operation instruction 14 and then sends a force sensor control instruction 15 to the force sensor 1301. The force sensor 1301 feeds back original force data 16 to the force sensor agent 1401, and the force sensor agent 1401 performs denoising and other processing on the original force data 16 and feeds back processed force data 17. As another example, a robot agent 1402 receives a robot operation instruction 18, and then sends pure motion control command 19 to the robot controller 1302-1 through a motion command channel, or sends real-time motion control command 20 maintaining a certain applied force to the robot controller 1302-1 through an interpolation channel, and the robot controller 1302-1 controls a robot arm 1302-2 to perform the corresponding operation, a robot operation state 21 is fed back to the robot agent 1402 through a robot state channel, and the robot agent 1402 feeds back the robot operation state 21. As another example, a 3D camera agent 1403 receives a 3D camera operation instruction 22 and then sends a 3D camera control instruction 23 to the 3D camera 1303. The 3D camera 1303 feeds back original 3D camera data 24 to the 3D camera agent 1403. The 3D camera agent 1403 performs denoising and other processing on the original 3D camera data 24 and feeds back processed 3D camera data 25.

In some embodiments, since each device agent is connected with the unified execution engine 120 and the production system skill library 110 through a data bus, they can access each other through an open interface. For example, the unified execution engine 120 and the production system skill library 110 can access each device agent. The unified execution engine 120 and each device agent can access the production system skill library 110. In addition, device agents can also access each other. That is, each device agent can provide a unified interface for the unified execution engine 120, the production system skill library 110 and other device agents, receive operation instructions from the unified execution engine 120 or a skill block in the production system skill library 110 or other device agents, and control the corresponding device to perform operations according to the operation instructions, and feedback the current operation state to the unified execution engine 120 or the skill block or the other device agent.

Figure 6:
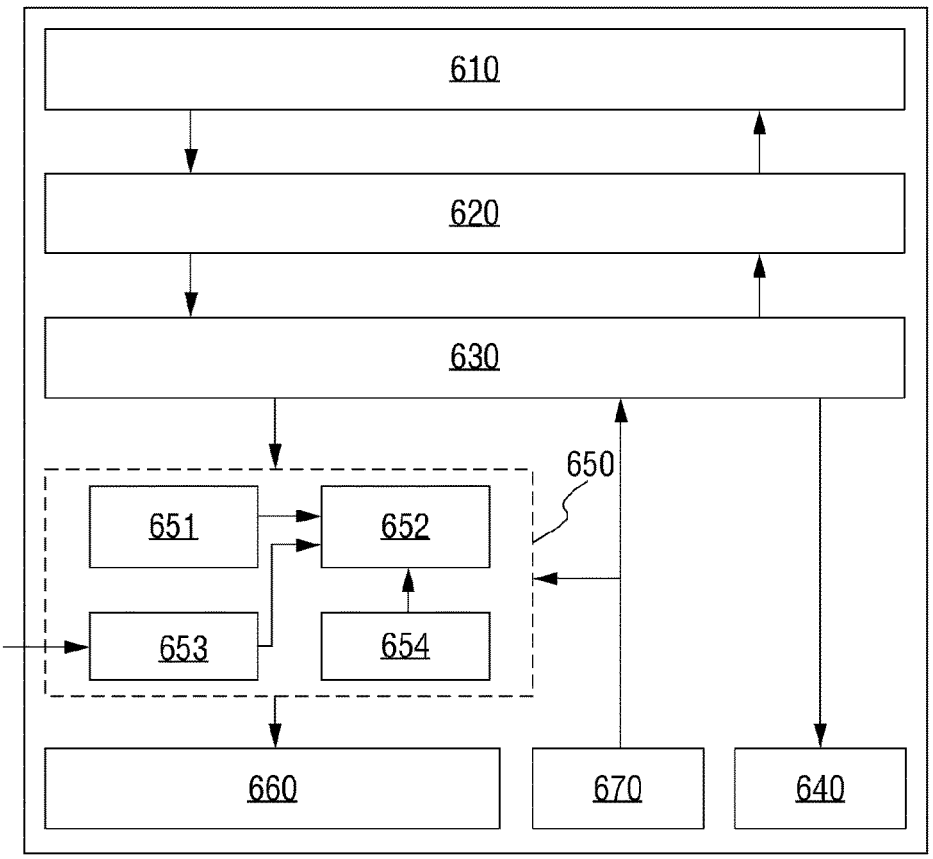
FIG. 6 is a schematic diagram illustrating an example robot agent incorporating teachings of the present disclosure.

Different types of device agents can have different specific implementation structures. For example, FIG. 6 is a schematic diagram illustrating a robot agent incorporating teachings of the present disclosure. As shown in FIG. 6, the robot agent may include a fourth communication interface 610, a command queue 620, a command execution engine 630, a motion command channel 640, a force motion adjustment module 650, an interpolation channel 660, and a robot state channel 670.

The command queue 620 is used to store operation instructions received through the fourth communication interface 610. The command execution engine 630 is configured to successively read each operation instruction from the command queue 620. When the operation instruction is a pure motion instruction, the command execution engine 630 sends the operation instruction to the corresponding robot device, such as a robot controller, through the motion command channel 640, so that the robot controller controls the corresponding robot. When the operation instruction is a motion instruction maintaining a certain applied force, the command execution engine 630 provides the operation instruction to the force motion adjustment module 650, receives a current operation state fed back by the robot device through the robot state channel 670. The pure motion instructions can be some instructions of standard motion, such as linear motion, circular motion, point-to-point motion, spline motion and so on. The motion instruction maintaining a certain applied force can be a moving contact instruction or a moving holding force instruction. Moving contact means that the robot will move in a straight line until it reaches a predetermined fixed 6-DOF force (for example, it can be measured by a 6-DOF sensor). The movement holding force refers to that the robot will move in a straight line, arc or spline while maintaining a time-varying 6-DOF force. In some embodiments, the 6-DOF force may include direction information.

The force motion adjustment module 650 is configured to dynamically determine the motion of the robot axis joint according to the operation instruction and the force data collected in real time by a force sensor, and provide the motion of the axis joint to the robot device, i.e. the robot controller, through the interpolation channel 660, so that the robot controller controls the force applied by the robot to the outside during the movement to reach a force value in the operation instruction.

When specifically implemented, the force motion adjustment module 650 may include an instruction parsing module 651, a motion path planning module 652, a force control module 653 and a conversion module 654. The instruction parsing module 651 is configured to analyze the operation instruction and obtain control information of a robot. The control information may include motion information and force information.

The motion path planning module 652 is configured to plan a Cartesian space path and a speed of a terminal center point (TCP) of a robot tool, and provide the Cartesian space path to the force control module 653, and obtain a fine tuned Cartesian space path fed back by the force control module 653, and then provide the fine-tuned Cartesian space path to the conversion module 654, and receive an axis joint position of the robot converted by the conversion module 654, and provide the axis joint position and the speed to a corresponding robot device, such as the robot controller.

The force control module 653 is configured to obtain force data of the terminal center point of the robot tool measured by the force sensor during the process of robot movement, fine tune the Cartesian space path from the motion path planning module 652 according to the force data, calculate the Cartesian compensation of the robot, obtain a fine-tuned Cartesian space path to maintain the required force, and then feedback the fine-tuned Cartesian space path to the motion path planning module 652.

When specifically implemented, the force data can be acquired by the motion path planning module 652 and then provided to the force control module 653, or be acquired by the force control module 653 independently. For example, the force control module 653 or the motion path planning module 652 can obtain the force data measured by the force sensor through a force sensor agent. Alternatively, the force control module 653 or the motion path planning module 652 can also send a service request to a corresponding skill block in the production system skill library 110, and the skill block interacts with the force sensor agent to obtain the force data measured by the force sensor.

Cartesian compensation may be calculated with the following equations (1) to (4):

$$f_{act} - f_{dsr} = M(\ddot{x}_{dsr} - \ddot{x}_{act}) + B(\dot{x}_{dsr} - \dot{x}_{act}) \quad (1)$$

$$\ddot{x}_{dsr}(t) = \ddot{x}_{act}(t) + \frac{1}{M}[f_{act}(t) - f_{dsr}(t) - B(\dot{x}_{dsr}(t-1) - \dot{x}_{act}(t))] \quad (2)$$

$$\dot{x}_{dsr}(t) = \dot{x}_{dsr}(t-1) + \ddot{x}_{dsr}(t)*T \quad (3)$$

$$x_{dsr}(t) = x_{dsr}(t-1) + \dot{x}_{dsr}(t)*T \quad (4)$$

Where $f_{act}$ is the actual 6-DOF sensed by the force sensor. $f_{dsr}$ is the 6-DOF force desired by the force motion. M is the robot system mass, B is the robot system damping. $\ddot{x}_{dsr}$, $\dot{x}_{dsr}$ and $\ddot{x}_{dsr}$ are TCP Cartesian acceleration, velocity and position for interpolation. $\ddot{x}_{act}$, $\dot{x}_{act}$ and $\ddot{x}_{act}$ are the actual robot TCP Cartesian acceleration, velocity and position. t is current interpolation cycle, t−1 is the previous interpolation cycle. T is the interpolation interval.

The conversion module 654 is configured to convert the fine-tuned Cartesian space path into a corresponding axis joint position, and feedback the axis joint position to the motion path planning module 652.

For other device agents, such as a sensor agent, or a tool agent that control a tool such as a gripper, etc., they may include a fourth communication interface 610, a command processing module (not shown), a command channel (not shown), and a feedback channel (not shown). The command processing module is configured to provide the operation instruction received through the fourth communication interface 610 to a corresponding device through the command channel, receive a current operation state or an operation result fed back by the device through the feedback channel, and transmit the current operation state or the operation result back to the bus 150 through the fourth communication interface 610.

Figure 7A:
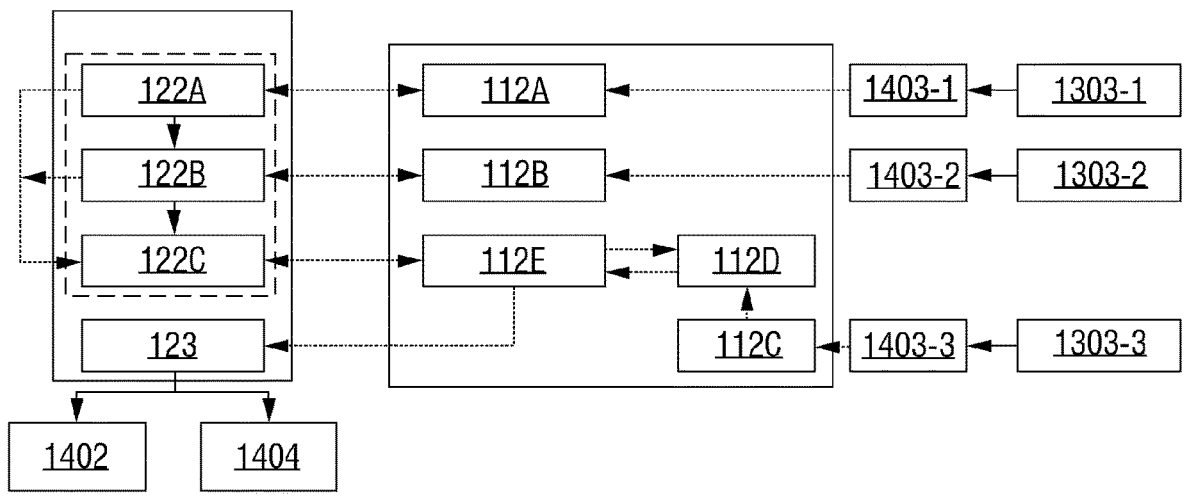
FIG. 7A is a schematic diagram illustrating an example application case incorporating teachings of the present disclosure.

FIG. 7A is a schematic diagram illustrating an application case incorporating teachings of the present disclosure. In this application case, a production system for palletizing is taken as an example, it shows how the production procedure of the production system is programmed in a simple way, with the capability of switching to another production system.

This application case is about palletizing and mainly involves the following components:
1) Unified execution engine 120 running on a PLC (e.g., SIMATIC S7-1500);
2) Production system skill library 110 running on an edge computing device (e.g., SIMATIC IPC427E)
3) Robot agent 1402 controlling a 3rd party robot (e.g., control KUKA robot via SIMATIC Robot Integrator)
4) Tool agent 1404 controlling a gripper (e.g., close or open the gripper fingers)
5) 3D camera agents which acquire and process raw 3D sensor data, the 3D camera agents may include:

A first 3D camera agent 1403-1, configured to control a first 3D camera 1303-1, the first 3D camera is used to identify the length, width, height and 6-DOF position of a package.

A second 3D camera agent 1403-2, configured to control a second 3D cameral 303-2, the second 3D camera is used to monitor the length, width, height of current pallet.

A third 3D camera agent 1403-3, configured to control a third 3D cameral 303-3, the third 3D camera is used to monitor the obstacle position and size and output environment model.

The skill blocks provided by the production system skill library 110 may include:
1) 3D Object position estimation skill block 112A, configured to calculate the length, width, height and 6-DOF position of a package based on data collected by the first 3D camera 1303-1.
2) Palletizing position calculation skill block 112B, configured to calculate the position where to place a new package into the pallet based on package information and palletizing space constraint data collected by the second 3D camera 1303-2.
3) Environment modeling skill block 112C, configured to identify an obstacles (for example, 6-DOF position and size) and generate an environment model.
4) Collision-free path planning skill block 112D, configured to calculate the way points forming a path where the robot will not collide with the environment when the environment model is given.

5) Collision-free palletizing skill block 112E, configured to generate the whole palletizing action sequence (including robot movement and gripper operation).

Figure 7B:
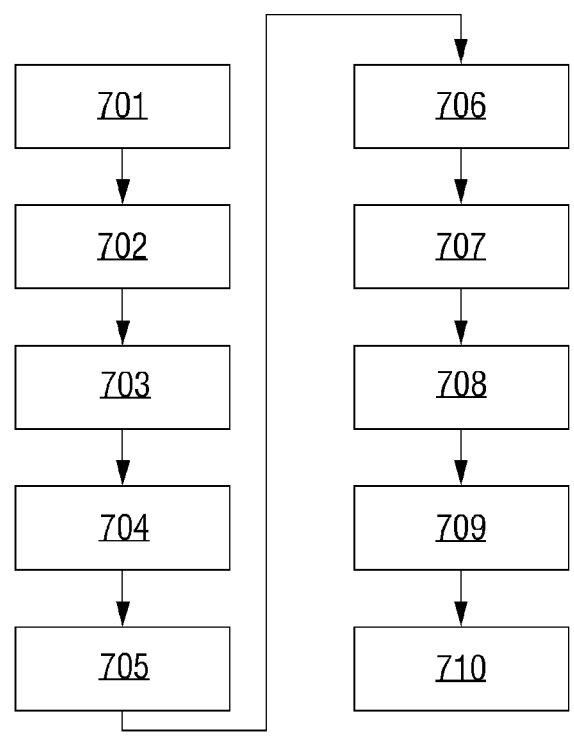
FIG. 7B is a flow diagram illustrating an example palletizing action sequence generated in the application case shown in FIG. 7A.

FIG. 7B is a flow diagram illustrating the palletizing action sequence generated in the application case shown in FIG. 7A. As shown in FIG. 7B, the action sequence includes: 701: move above a starting position of palletizing operation; 702: open the gripper; 703: move to the starting position of palletizing operation; 704: close the gripper; 705: move above the starting position of palletizing operation; 706: moves spline to way points; 707: move to the end position of palletizing operation; 708: open the gripper; 709: move above the end position of palletizing operation; 710: point to point movement to home.

On the unified execution engine 120, the following skill function blocks are provided for user to program the production system for the palletizing application case:

1) Object position obtaining function block 122A: the output of this function block is a starting position of palletizing operation, which calls the above 3D object position estimation skill block 112A.
2) Palletizing position calculation function block 122B: the output of this function block is the end position of palletizing operation, which calls the above palletizing position calculation skill block 112B.
3) Collision-free palletizing function block 122C: this function block takes the results of object position obtaining function block 122A and palletizing position calculation function block 122B as input parameters, and calls three skills: collision-free palletizing, environment modeling and collision-free path planning, that is, calls the above collision-free palletizing skill block 112E, environment modeling skill block 112C and collision-free path planning skill block 112D, to obtain a corresponding action sequence, including robot movement (e.g., spline movement to all path points of the path) and gripper operation.

It can be seen that users only need to use three skill function blocks to complete the programming of the palletizing application case, and all background execution, scheduling and service provision will be automatically processed by the system. The functionality and flexibility of the production system will be further improved by adding more skills to the production system skill library, adding corresponding skill function blocks in the unified execution engine, and adding appropriate new agents.

An example system for production system automatic control incorporating teachings of the present disclosure is described in detail above, and some example methods for production system automatic control incorporating teachings of the present disclosure are described in detail hereinafter. The methods for production system automatic control can be implemented on the systems for production system automatic control described herein. For the details not disclosed in the examples of the method of the present disclosure, please refer to the corresponding description in the examples of the system of the present disclosure, which will not be repeated here.

Figure 8:
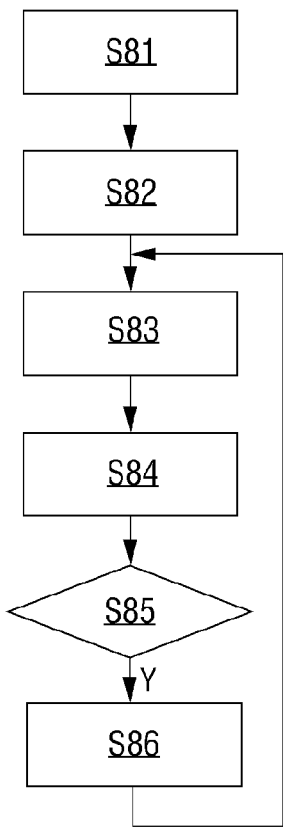
FIG. 8 is a flow diagram illustrating an example method for production system automatic control incorporating teachings of the present disclosure.

FIG. 8 is flow diagram illustrating a method for production system automatic control incorporating teachings of the present disclosure. As shown in FIG. 8, the method may include the following processes:

At block S81, a plurality of skill blocks describing and encapsulating implementation part of skills involved in production process in a software method and a plurality of skill function blocks describing and encapsulating interface part of the skills involved in the production process in a software method are preset.

At block S82, a production procedure programmed by a user based on the skill function blocks is received, and the first skill function block in the production procedure is taken as the current skill function block.

At block S83, the current skill function block is started to call at least one corresponding skill block, each called skill block executes its own skill, and controls a corresponding device to perform operation through a corresponding device agent according to the demand of skill execution. At this block, for a sensor output skill block, it can interact with a sensor agent to obtain the data collected by the sensor.

At block S84, a service response returned by the skill block is received, and a corresponding device is controlled to perform operations through a corresponding device agent according to the needs of the service response. At this block, when the service response is an action sequence, block S84 may include: adding the action sequence to an action queue; reading the actions in the action sequence in turn, and sending at least one operation instruction corresponding to read at least one action to a corresponding device agent, so that the device agent controls the device to execute the actions in the action sequence in turn according to the operation instruction, and feeds back a corresponding operation state; deleting the current action from the action queue when determining that the execution of the current action is completed according to the operation state; when the action queue is empty, it is determined that the execution of the action sequence is completed.

Where, when the device agent is a robot agent, then, wherein the device agent controls the device to execute the actions in the action sequence in turn according to the operation instruction, and feeds back the corresponding operation state, may include: adding the operation instruction to a command queue; sequentially reading each operation instruction from the command queue; when the read operation instruction is a pure motion instruction, sending the operation instruction to a corresponding robot device to enable the robot device to perform the corresponding operation; when the read operation instruction is a motion instruction maintaining a certain applied force, dynamically determining a motion of the robot axis joint according to the operation instruction and the force data collected in real time by a force sensor, and sending the motion of the axis joint to the robot device to enable the robot device to perform the corresponding operation; receiving a current operation state fed back by the robot device.

In some embodiments, dynamically determining the motion of the robot axis joint according to the operation command and force data collected in real time by the force sensor, and sends the motion of the axis joint to the robot equipment, which can include: analyzing the operation instruction to obtain control information of the robot, and the control information includes motion information and force information; planning a Cartesian space path and a speed of a terminal center point of a robot tool according to the motion information and the force information; during the movement of the robot, obtaining force data of the terminal center point of the robot tool measured by a force sensor; fine tuning the Cartesian space path according to the force data, calculating the Cartesian compensation of the robot, and obtaining the fine-tuned Cartesian space path; converting the fine-tuned Cartesian space path into a corresponding axis joint position; providing the axis joint position and the speed to the corresponding robot controller.

When the device agent is not a robot agent, the device agent controls the device to execute the actions in the action sequence in turn according to the operation instruction, and feeds back the corresponding operation state, may include: providing the operation instruction to a corresponding device and receiving a current operation state or an execution result fed back by the device. In addition, if the service response is not an action sequence, there is no need to interact with the device agent.

At block S85, after the current skill function block is successfully executed, it is determined that whether there is still a skill function block that has not been started. When there is still a skill function block that has not been started, block S86 is performed; otherwise, the current process can be ended.

In some embodiments, each skill function block maintains a state machine, which is idle when the corresponding skill function block is not started; when the corresponding skill function block is started, it is converted to the "active" state; when the corresponding skill function block is successfully executed, it is converted to the "done" state; when an error occurs in the execution of the corresponding skill function block, it will be converted to the "error" state. In this block, the execution state of the corresponding skill function block can be determined according to the state of the state machine, such as whether it has been successfully executed.

At block S86, the next skill function block is taken as the current skill function block, and return to block S83.

In fact, the system for production system automatic control provided by this implementation manner of the present disclosure may be specifically implemented in various manners. For example, the system for production system automatic control may be compiled, by using an application programming interface that complies with a certain regulation, as a plug-in that is installed in an intelligent terminal, or may be encapsulated into an application program for a user to download and use.

When compiled as a plug-in, the system for industrial App development may be implemented in various plug-in forms such as ocx, dll, and cab. The system for industrial App development provided by this implementation manner of the present disclosure may also be implemented by using a specific technology, such as a Flash plug-in technology, a RealPlayer plug-in technology, an MMS plug-in technology, a MIDI staff plug-in technology, or an ActiveX plug-in technology.

The method for industrial App development provided by this implementation manner of the present disclosure may be stored in various storage mediums in an instruction storage manner or an instruction set storage manner. These storage mediums include, but are not limited to: a floppy disk, an optical disc, a DVD, a hard disk, a flash memory, a USB flash drive, a CF card, an SD card, an MMC card, an SM card, a memory stick, and an xD card.

In addition, the method for industrial App development provided by this implementation manner of the present disclosure may also be applied to a storage medium based on a flash memory (Nand flash), such as USB flash drive, a CF card, an SD card, an SDHC card, an MMC card, an SM card, a memory stick, and an xD card.

Moreover, it should be clear that an operating system operated in a computer can be made, not only by executing program code read by the computer from a storage medium, but also by using an instruction based on the program code, to implement some or all actual operations, so as to implement functions of any embodiment in the foregoing embodiments.

Figure 9:
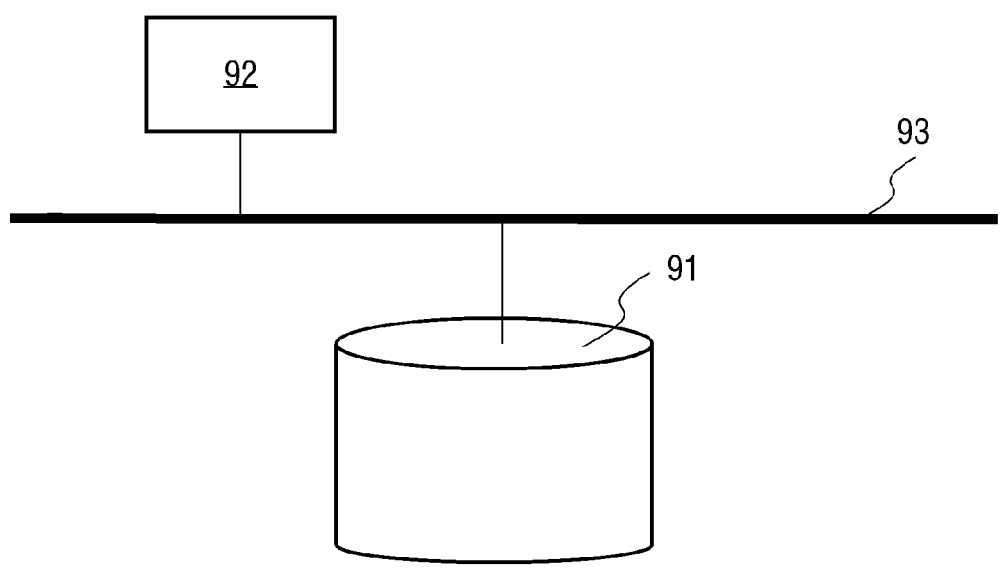
FIG. 9 is a schematic diagram illustrating another example system for production system automatic control incorporating teachings of the present disclosure.

For example, FIG. 9 is a schematic diagram illustrating another system for production system automatic control according to examples of the present disclosure. The system may be used to perform the method shown in FIG. 8, or to implement the system shown in FIG. 1. As shown in FIG. 9, the system may include at least one memory 91 and at least one processor 92. In addition, some other components may be included, such as communication port, input/output controller, network communication interface, etc. These components communicate through bus 93, etc.

At least one memory 91 is configured to store a computer program. In one example, the computer program can be understood to include various modules of the system shown in FIG. 1. In addition, at least one memory 91 may store an operating system or the like. Operating systems include but are not limited to: Android operating system, Symbian operating system, windows operating system, Linux operating system, etc.

At least one processor 92 is configured to call the computer program stored in at least one memory 91 to perform a method for production system automatic control described in examples of the present disclosure. The processor 92 can be CPU, processing unit/module, ASIC, logic module or programmable gate array, etc. It can receive and send data through the communication port.

The I/O controller has a display and an input device, which is used to input, output and display relevant data.

It can be seen from above mentioned technical solutions in examples of the present disclosure, skill blocks describing and encapsulating the implementation part of the skills involved in the production process by software method and a plurality of skill function blocks describing and encapsulating the interface part of the skills involved in the production process by software method are set respectively, In this way, the user only needs to program the production procedure based on the skill function block, and then the background calls the corresponding skill block by successively starting each skill function block in the production procedure to complete the corresponding production system skills, which simplifies the user's automatic control programming process of the production system and reduces the user's programming difficulty. Moreover, because the production system can be easily reprogrammed, it can cope with the rapid change of small batch production.

As used herein, unless the context clearly supports exceptions, the singular forms "a" ("a", "an", "the") are intended to include the plural forms. It should also be understood that, "and/or" used herein is intended to include any and all possible combinations of one or more of the associated listed items.

The number of the embodiments of the present disclosure are only used for description, and do not represent the merits of the implementations.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A system for production system automatic control, the system comprising:
a production system skill library;
a unified execution engine; and
device agents for controlling corresponding devices in production system; wherein,
the production system skill library includes a plurality of skill blocks describing and encapsulating implementation part of skills involved in production process in a software method;
the production system skill library is configured to call at least one corresponding skill block according to a received service request, and return a corresponding service response according to an execution result of the at least one skill block;
the at least one skill block sends an operation instruction to a corresponding device agent according to the needs of skill execution;
the unified execution engine includes a plurality of skill function blocks describing and encapsulating interface part of the skills involved in the production process in a software method;
the unified execution engine is configured to obtain a production procedure programmed by a user based on the skill function blocks, sequentially start each skill function block in the production procedure;
when a skill function block is started, the skill function block sends a service request to the production system skill library and receives a service response from the production system skill library, sends an operation instruction to a corresponding device agent according to the needs of the service response; and
each device agent is configured to provide a unified interface for the unified execution engine and the production system skill library, receive the operation instruction from the unified execution engine or a skill block in the production system skill library, and control a corresponding device to perform operations according to the operation instruction, and feedback a current operation state or an operation result to the unified execution engine or the skill block.

2. The system according to claim 1, wherein:
the production system skill library comprises: a skill management module, a plurality of skill blocks and a first communication interface;
each skill block describes and encapsulates the implementation part of a skill involved in the production process in a software method configured to execute corresponding skill when called, and interact with the corresponding device agent according to the needs of skill execution; and
the skill management module is configured to parse the service request received through the first communication interface, call at least one corresponding skill block according to a parsing result, and receive and output a service response returned by the at least one skill block.

3. The system according to claim 2, wherein the plurality of skill blocks comprises:
at least one action sequence skill block, each action sequence skill block is a single skill block or a combination of multiple interrelated skill blocks, and the service response of the action sequence skill block feeds back an action sequence;
at least one sensor output skill block, each sensor output skill block obtains data of a field sensor through interaction with a sensor agent, or obtains data output by a sensor processing algorithm with sensor data as input; the service response of the sensor output skill block feeds back sensor output data; and
at least one algorithm computing skill block, the service response of the algorithm computing skill block feeds back corresponding calculation results.

4. The system according to claim 3, wherein:
the action sequence skill block comprises a combination of an environment modeling skill block, a collision-free path planning skill block and a collision-free palletizing skill block;
the environment modeling skill block is configured to identify an obstacles and generate an environment model;
the collision-free path planning skill block is configured to calculate way points forming a path where a device will not collide with the environment when the environment model is given;
the collision-free palletizing skill block is configured to generate the whole palletizing action sequence; and
the sensor output skill blocks comprises:
the 3D object position estimation skill block, to calculate the length, width, height and 6-DOF position of the package, and
the palletizing position calculation skill block, to calculate the position where new packages are placed in the stacking.

5. The system according to claim 1, wherein:
the unified execution engine comprises: a skill execution engine, a plurality of skill function blocks, an action queue, an action execution engine, a second communication interface and a third communication interface;
each skill function block corresponds to at least one skill block, and each skill function block is configured to describe and encapsulate the interface part of a skill in a software method; when being executed, to send a service request to the production system skill library through the second communication interface, and receive a service response returned by the production system skill library; when the service response is an action sequence, to add the action sequence to the action queue, and read a current operation state of the action sequence from the action queue; when the current operation state indicates that all actions in the action sequence are completed, to return a completed indication to the skill execution engine;
the skill execution engine is configured to obtain a production procedure programmed by a user based on the skill function blocks, and start each skill function block in the production procedure in turn; when current skill function block returns a completed indication, to start the next skill function block; when the current skill function block returns a service response and when the service response needs to be used as the input of the next skill function block, to provide the service response to the next skill function block;
the action queue is configured to store the action sequence in the service response and update a current operation state of the action sequence in real time; and
the action execution engine is configured to successively read actions in the action sequence when there is an action sequence in the action queue, send an operation instruction corresponding to at least one read action to a corresponding device agent through the third communication interface, and receive a current operation state fed back by the device agent, and provide the current operation state to the action queue; when the current operation state indicates that the current action is successfully executed, delete the current action from the action sequence until the action queue is empty.

6. The system according to claim 5, wherein each skill function block maintains a state machine; and
when the corresponding skill function block is not started, the state machine is "idle" state; when the corresponding skill function block is started, the state machine is converted to "active" state; when the corresponding skill function block is successfully executed, the state machine is converted to "done" state; when an error occurs in the execution of the corresponding skill function block, the state machine is converted to "error" state.

7. The system according to claim 1, wherein the device agents comprise: a robot agent, and the robot agent comprises a fourth communication interface, a command queue, a command execution engine, a motion command channel, a force motion adjustment module, an interpolation channel, and a robot state channel; wherein,
the command queue is configured to store operation instructions received through the fourth communication interface;
the command execution engine is configured to successively read each operation instruction from the command queue; when the operation instruction is a pure motion instruction, to send the operation instruction to a robot controller through the motion command channel; when the operation instruction is a motion instruction maintaining a certain applied force, to provide the operation instruction to the force motion adjustment module, to receive a current operation state fed back by the robot controller through the robot state channel; and
the force motion adjustment module is configured to dynamically determine motion of robot axis joint according to the operation instruction and force data collected in real time by a force sensor, and provide the motion of the axis joint to the robot controller through the interpolation channel.

8. The system according to claim 7, wherein:
the force motion adjustment module comprises an instruction parsing module, a motion path planning module, a force control module and a conversion module;
the instruction parsing module is configured to analyze the operation instruction and obtain control information of a robot;
the motion path planning module is configured to plan a Cartesian space path and a speed of a terminal center point of a robot tool, and provide the Cartesian space path to the force control module, and obtain a fine tuned Cartesian space path fed back by the force control module, provide the fine-tuned Cartesian space path to the conversion module, and receive an axis joint position of the robot converted by the conversion module, and provide the axis joint position and the speed to the robot controller; and
the force control module is configured to obtain force data of the terminal center point of the robot tool measured by a force sensor during the process of robot movement, fine tune the Cartesian space path from the motion path planning module according to the force data to obtain a fine tuned Cartesian space path to maintain a required force, and feedback the fine-tuned Cartesian space path to the motion path planning module.

9. The system according to claim 1, wherein:
the device agents comprise: a sensor agent and/or a tool agent, the sensor agent or the tool agent comprises: a fourth communication interface, a command processing module, a command channel, and a feedback channel; and
the command processing module is configured to provide an operation instruction received through the fourth communication interface to a corresponding device through the command channel, receive a current operation state or an operation result fed back by the device through the feedback channel, and transmit the current operation state or the operation result back to the bus through the fourth communication interface.

10. A method for production system automatic control, the method comprising:
presetting a plurality of skill blocks describing and encapsulating implementation part of skills involved in production process in a software method and a plurality of skill function blocks describing and encapsulating interface part of the skills involved in the production process in a software method;
receiving a production procedure programmed by a user based on the skill function blocks, and taking the first skill function block in the production procedure as current skill function block;
starting the current skill function block to call at least one corresponding skill block, each called skill block executes corresponding skill, and controlling a corresponding device to perform operation through a corresponding device agent according to demand of skill execution;
receiving a service response returned by the skill block, and controlling a corresponding device to perform operation through a corresponding device agent according to needs of the service response; and
when the current skill function block is successfully executed and there is still a skill function block that has not been started, taking the next skill function block as the current skill function block, and return to the operation of starting the current skill function block to call at least one corresponding skill block.

11. The method according to claim 10, wherein:
a service response comprises an action sequence;
controlling a corresponding device to perform operation through a corresponding device agent according to demand of skill execution comprises:
adding the action sequence to an action queue,
reading actions in the action sequence in turn,
sending at least one operation instruction corresponding to read at least one action to a corresponding device agent;
controlling, by the device agent, a corresponding device to execute the actions in the action sequence in turn according to the operation instruction, and feeding back a corresponding operation state; and
deleting current action from the action queue when determining that the execution of the current action is completed according to the operation state; and
when the action queue is empty, it is determined that the execution of the action sequence is completed.

12. The method according to claim 11, wherein:
the device agent comprises a robot agent;
controlling, by the device agent, a corresponding device to execute the actions in the action sequence in turn according to the operation instruction, and feeding back a corresponding operation state, comprises:

adding the operation instruction to a command queue;
sequentially reading each operation instruction from the command queue,
when a read operation instruction is a pure motion instruction, sending the operation instruction to a robot controller to enable the robot controller to perform corresponding operation,
when a read operation instruction is a motion instruction maintaining a certain applied force, dynamically determining a motion of the robot axis joint according to the operation instruction and force data collected in real time by a force sensor, and sending the motion of the axis joint to the robot controller to enable the robot controller to perform corresponding operation, and
receiving a current operation state fed back by the robot controller.

13. The method according to claim 12, wherein dynamically determining a motion of the robot axis joint according to the operation instruction and force data collected in real time by a force sensor, and sending the motion of the axis joint to the robot controller to enable the robot controller to perform corresponding operation, comprises:
analyzing the operation instruction to obtain control information of a robot;
planning a Cartesian space path and a speed of a terminal center point of a robot tool according to the control information;
obtaining force data of the terminal center point of the robot tool measured by a force sensor during the movement of the robot;
fine tuning the Cartesian space path according to the force data, and obtaining fine-tuned Cartesian space path;
converting the fine-tuned Cartesian space path into a corresponding axis joint position; and
providing the axis joint position and the speed to the robot controller.

14. The method according to claim 10, wherein each skill function block maintains a state machine, when the corresponding skill function block is not started, the state machine is "idle" state; when the corresponding skill function block is started, the state machine is converted to "active" state; when the corresponding skill function block is successfully executed, the state machine is converted to "done" state; when an error occurs in the execution of the corresponding skill function block, the state machine is converted to "error" state.

15. A system for production system automatic control, the system comprising:
at least one memory, to store a computer program; and
at least one processor, to call the computer program stored in the at least one memory to cause the at least one processor to:
preset a plurality of skill blocks describing and encapsulating implementation part of skills involved in production process in a software method and a plurality of skill function blocks describing and encapsulating interface part of the skills involved in the production process in a software method;
receive a production procedure programmed by a user based on the skill function blocks, and taking the first skill function block in the production procedure as current skill function block;
start the current skill function block to call at least one corresponding skill block, each called skill block executes corresponding skill, and controlling a corresponding device to perform operation through a corresponding device agent according to demand of skill execution;
receive a service response returned by the skill block, and controlling a corresponding device to perform operation through a corresponding device agent according to needs of the service response; and
when the current skill function block is successfully executed and there is still a skill function block that has not been started, take the next skill function block as the current skill function block, and return to the operation of starting the current skill function block to call at least one corresponding skill block.

* * * * *